Oct. 6, 1931.  C. C. PITTMAN  1,825,678
CYLINDER LINING
Filed May 7, 1928

INVENTOR
Cloris C. Pittman

By his Attorney

Patented Oct. 6, 1931

1,825,678

UNITED STATES PATENT OFFICE

CLOVIS C. PITTMAN, OF NEW YORK, N. Y., ASSIGNOR OF ONE-HALF TO THOMAS G. McCLATCHEY, OF NEW YORK, N. Y.

CYLINDER LINING

Application filed May 7, 1928. Serial No. 275,625.

This invention relates to improvements in cylinders for engines, such as steam and internal combustion engines.

*Objects.*—Among the principal objects which the present invention has in view are:

To provide an engine cylinder having a hard piston wearing surface; to provide for the insulation of the cylinder to prevent the loss of heat therefrom; to provide an engine cylinder having a lining of a heat-insulating, hard-wearing material; to generally improve, simplify and increase the efficiency of the construction.

Other objects and advantages of the invention will appear as the description proceeds.

Figure 1:
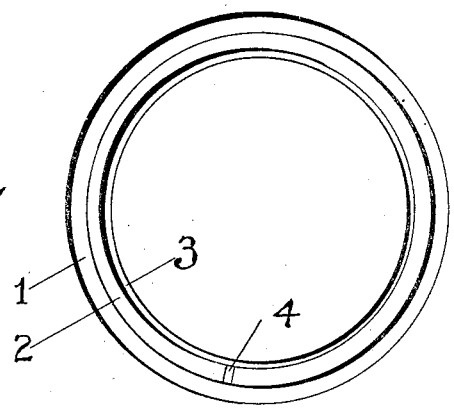
Figure 2:
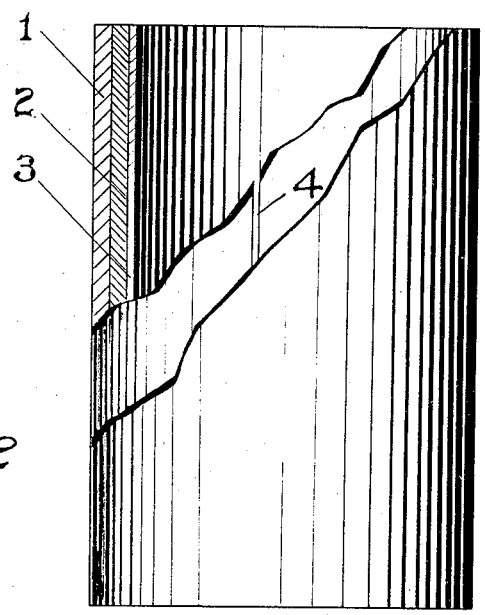

*Drawings.*—Figure 1 is a plan view of an engine cylinder constructed in accordance with the present invention; and Figure 2 is a side elevational view of the engine cylinder, partly broken away and in section, to illustrate the nature of the construction.

*Description.*—As shown in the drawings, the invention is embodied in an engine cylinder which comprises a hollow external cylindrical portion 1 of iron or like material of a strong, resisting character, an intermediate hollow cylindrical portion 2 disposed on the interior of the iron portion and composed of brass, copper or similar ductile material, and a hollow internal cylindrical lining 3 composed of a non-metallic heat-insulating material such as quartz silicate, or fused silicate. The non-metallic material 3 serves to insulate the cylinder and prevent loss of heat from the interior thereof through the cylinder walls and thus serves to render the operation of the engine more efficient. At the same time, this material or lining 3 provides a hard wearing surface for the piston working within the cylinder, resulting in a smooth, efficient operation of the piston with little escape or leakage of gas or steam past the piston in service. Moreover, the superior wearing qualities of the lining of the cylinder give it a longer life, and the cylinder requires less attention and repair during use. As stated, I prefer to employ a non-metallic material for the lining such as fused silicate or quartz silicate, as such material has the desired wearing and heat insulating properties.

As best shown in Figure 1, the intermediate ductile portion 2, is provided with a cut or slit 4 extending lengthwise of the cylinder. The portion 2 serves to unite the lining 3 to the exterior or body portion 1 of the cylinder and the slit is provided to allow for the expansion of the material 2 during service. It is desirable that the expansion occur circumferentially and not lengthwise of the cylinder as circumferential expansion does not affect the lining and for this reason a ductile material such as brass or copper which expands circumferentially is used for the intermediate part 2 and the slit 4 is provided to take care of the expansion. The body portion, 1, of the cylinder may be made of iron or any other material now commonly used for engine cylinders or any other material that may be adapted for such use.

The cylinder of this invention may be applied to engines such as steam and internal combustion engines and to such other engines and machines as utilize cylinders and the invention is not be construed as limited to any particular engine or machine.

Claims:

1. An engine cylinder comprising a hollow cylindrical body portion, a cylindrical lining of a heat insulating and hard wearing material, and a slit intermediate cylindrical portion of ductile material between the body portion and lining.

2. An engine cylinder comprising a hollow cylindrical body portion of iron, a cylindrical silicate lining, and a slit intermediate cylindrical portion of ductile material between the lining and body portion.

CLOVIS C. PITTMAN.